P. H. HUMES.
Hand-Truck.
No. 2,804. Reissued Nov 19, 1867.
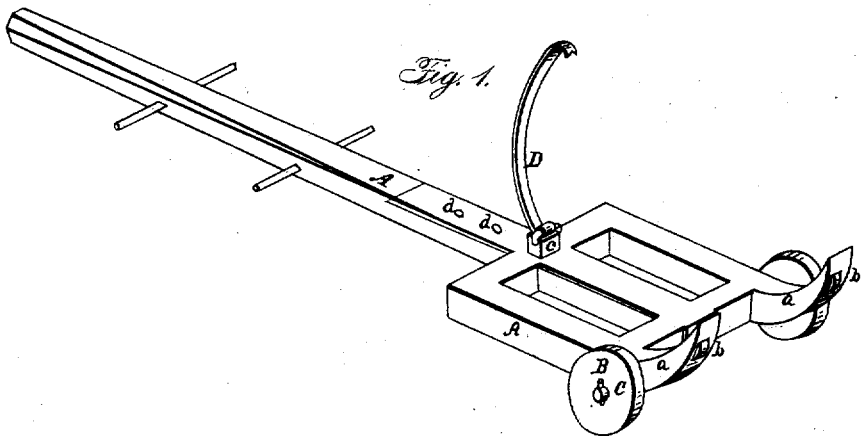
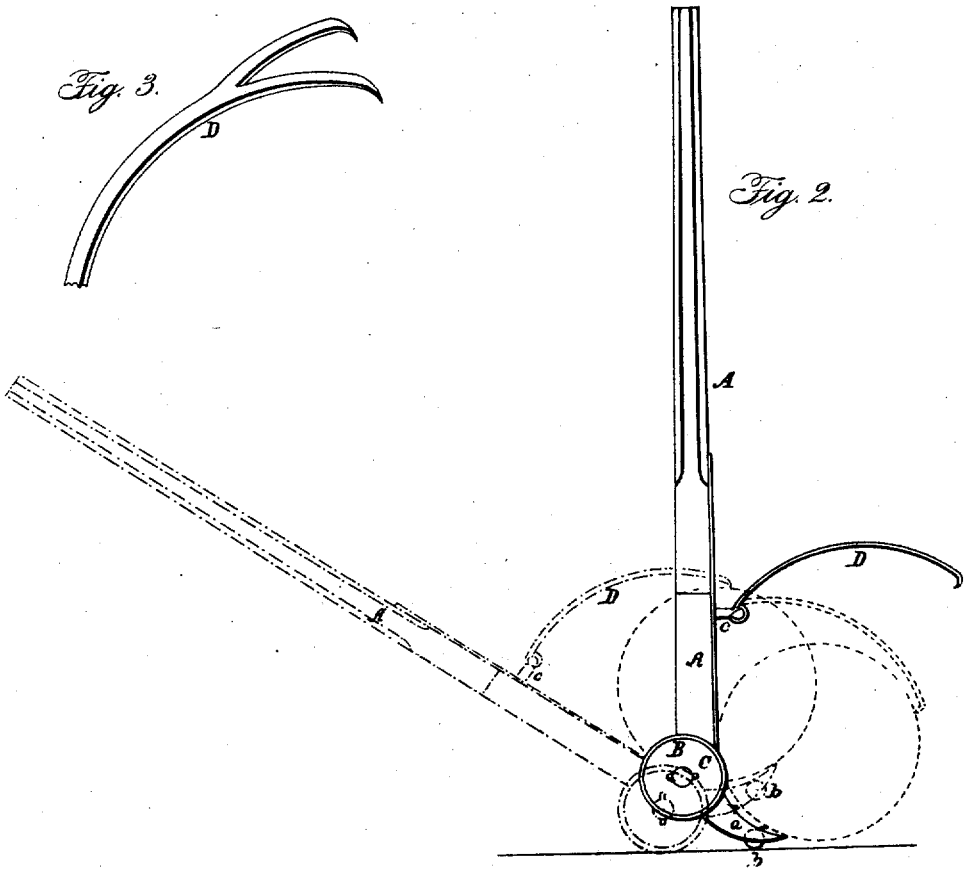
AM. PHOTO-LITHO. CO. N.Y. (OSBORNE'S PROCESS.)

United States Patent Office.

P. H. HUMES, OF WATSON'S SALT CREEK, ILLINOIS, ASSIGNOR TO WILLIAM C. RENTGEN, OF KEOKUK, IOWA.

*Letters Patent No.* 31,741, *dated March* 19, 1861; *reissue No.* 2,804, *dated November* 19, 1867.

IMPROVEMENT IN HAND-TRUCKS.

The Schedule referred to in these Letters Patent and making part of the same.

TO ALL WHOM IT MAY CONCERN:

Be it known that WILLIAM C. RENTGEN, of Keokuk, in the county of Lee, and State of Iowa, hath invented a new and useful Improvement in Hand-Trucks; and I, P. H. HUMES, of Watson's Salt Creek, in the county of Effingham, and State of Illinois, assignee of said RENTGEN, do hereby declare that the following is a full, clear, and exact description thereof, reference being had to the accompanying drawings, forming a part of this specification, in which—

Figure 1 is a perspective view of my improved truck.

Figure 2 is a side view of the same.

Figure 3 is a detached view of the same.

Similar letters of reference in each of the several figures indicate corresponding parts.

The nature of my invention consists in the employment of a hinged, curved, adjustable, holding and stop-bar, in combination with sharp curved parts or ends, or an inclined portion of the truck, with or without auxiliary wheels or rollers, whereby sugar-hogsheads, bales of cotton, &c., can be picked up and rolled away with great convenience, ease, and safety, as will be presently shown.

To enable others skilled in the art to make and use my invention, I will proceed to describe its construction and operation.

A represents a truck-frame, constructed very similarly to the frames of trucks at present in use. B B are the wheels, arranged on an axle, C. The rear portion of the truck-frame is curved, as shown at *a*, so as to pass under a hogshead or bale, as illustrated in fig. 2, and fit snugly the form of the same. In this curved portion small auxiliary rollers *b b*, are arranged, so that, when the frame is thrown up to the position shown in fig. 2, it shall rest upon rollers, and thus move easily, while its curved back portion is passing under the hogshead or bale. By having auxiliary rollers the truck can be rolled up the steps, as said rollers serve for the truck to run upon until the large rollers come into play or rest upon the steps. D is a hinged curved holding and stop-bar or hook. It is attached to the forward part of the frame by means of a bolt, *c*, so that it may be shifted back or forward, to suit the different sizes of hogsheads or bales to be carried. The holes *d d* allow for these adjustments.

The black dotted circle shows the hogshead just in the act of being picked up, and the black dotted lines show the holding and stop-hook thrown down and holding the hogshead from falling backward or rolling forward. The red dotted circle shows the hogshead fairly up on the truck, or as it appears when the truck is adjusted to an inclined position, so as to rest upon its main wheels, as shown in full red lines.

This machine is self-loading by the process now described.

Elevate the lever to a vertical position, slide the two points of sides under the package, by a pressure of the foot, which is easily done by the small wheels at the ends of the curved side pieces. The cant-hook is set full upon the package, then the simple bearing upon the lever elevates the package and places it upon the machine. By placing the lever in a vertical position, resting the machine upon the small wheels in the ends of the sides, the truck-wheels will be raised from the floor. The small wheels and jambs of the sides act as a fulcrum until the wheels strike the floor.

I do not claim the use of a holding adjustable hook, irrespective of the manner of attaching and adjusting said hook, and of its combination with the curved parts or ends *a a* of the truck, but what I do claim as my invention, and desire to secure by Letters Patent, is—

The curved parts or ends *a a* of the truck, with or without the auxiliary wheels *b b*, in combination with the curved removable holding and stop-bar D, made either of a single piece or divided at its extremity, substantially as and for the purposes set forth.

P. H. HUMES.

Witnesses:

WM. GILBRAM,

B. F. KAGAY.